United States Patent [19]

Zykan

[11] Patent Number: 5,696,705
[45] Date of Patent: Dec. 9, 1997

[54] SYSTEM AND METHOD FOR RECONSTRUCTION OF THE POSITION OF OBJECTS UTILIZING A SIGNAL TRANSMITTING AND RECEIVING DISTANCE DETERMINING DEVICE

[75] Inventor: Blair J. Zykan, Englewood, Colo.

[73] Assignee: Laser Technology, Inc., Englewood, Colo.

[21] Appl. No.: 520,651

[22] Filed: Aug. 29, 1995

[51] Int. Cl.$^6$ ............................................. G01S 1/08
[52] U.S. Cl. ................. 364/561; 364/460; 364/565; 356/3.03; 367/99; 250/201.6; 342/451; 342/458
[58] Field of Search .................. 356/3, 5, 28, 376, 356/3.03, 5.01, 5.05, 141.1, 5.11; 364/460, 561; 342/112, 118, 114, 125, 127, 128, 451, 458; 219/124; 250/559, 201.6; 367/99, 101, 909; 180/167, 169; 340/435, 436

[56] References Cited

U.S. PATENT DOCUMENTS

| | | | |
|---|---|---|---|
| 3,796,058 | 3/1974 | Jones et al. | 235/150.27 |
| 3,922,533 | 11/1975 | Royal | 235/120.27 |
| 4,730,190 | 3/1988 | Win et al. | 342/118 |
| 4,835,537 | 5/1989 | Manion | 364/461 |
| 5,221,956 | 6/1993 | Patterson et al. | 356/28 |
| 5,263,261 | 11/1993 | Piety et al. | 364/561 |
| 5,546,072 | 8/1996 | Creuseremee et al. | 340/451 |

OTHER PUBLICATIONS

"Making a point about safer highways." Laser Technology, Inc. brochure. © 1993 Laser Technology, Inc., Englewood, Colorado.

M.A. Davis, "Traffic—Laser: A New Tool for Accident Investigators", *Law and Order*, Jan. 1992, Hendon, Inc., Wilmette, Illinois.

W.A. Kennedy and G.L. Stephens, "Test of Laser Speed Detection System", *Accident Reconstruction Journal*, Jan./Feb. 1992, Waldorf, Maryland.

M.A. Davis, "Traffic—Measuring With a Laser", *Law and Order*, Feb. 1994, Hendon, Inc., Wilmette, Illinois.

M. Bradshaw and B. Zykan, "Improving Data Acquisition and Conversion Productivity Using Laser Mapping Systems", Mar. 14, 1994, AM/FM International Conference, Denver, Colorado.

*Primary Examiner*—Emanuel T. Voeltz
*Assistant Examiner*—Cuong H. Nguyen
*Attorney, Agent, or Firm*—William J. Kubida, Esq.; John R. Wahl, Esq.; Holland & Hart, LLP

[57] ABSTRACT

A system and method for data entry and retroactive reconstruction of the relative position of features and objects, in particular with respect to scenes such as transitory occurrences, utilizing a signal transmitting and receiving distance determining device. In a particular embodiment, the system and method disclosed has especial applicability to the on-scene recordation and subsequent ex post facto reconstruction of traffic accident scenes by law enforcement officers and may be readily and efficiently implemented in conjunction with a commercially available laser-based speed and distance determining device otherwise usable for vehicle speed traffic monitoring functions utilizing either triangulation or baseline/offset mensuration techniques.

38 Claims, 5 Drawing Sheets

SYSTEM AND METHOD FOR RECONSTRUCTION OF THE POSITION OF OBJECTS UTILIZING A SIGNAL TRANSMITTING AND RECEIVING DISTANCE DETERMINING DEVICE

BACKGROUND OF THE INVENTION

The present invention relates, in general, to a system and method for data entry and retroactive reconstruction of the relative position of features and objects, in particular with respect to scenes such as transitory occurrences, utilizing a signal transmitting and receiving distance determining device. More particularly, the present invention relates to a system and method of especial applicability to the on-scene recordation and subsequent ex post facto reconstruction of traffic accident scenes by law enforcement officers which is readily and efficiently implemented in conjunction with the utilization of variations on existing accident reconstruction procedures together with a commercially available laser-based speed and distance determining device otherwise usable for vehicle speed traffic monitoring functions.

Transitory events, such as accident scenes in particular, must be accurately and quickly recorded in situ prior to the removal of the affected vehicles and the like for purposes of later reconstructing the relative position of various features and objects and their relationship to fixed positions at the site. The data collected is then utilized to establish the final position of the vehicles and associated debris as well as to provide information from which reasonable inferences might be drawn concerning the events leading up to the accident.

Because, by their very nature, vehicular accidents almost always occur on or adjacent to roadways, the conventional methods of accurately recording the data necessary to accurately establish relative vehicle positions with respect to fixed adjacent objects (such as road signs, telephone poles and the like) utilizing a roll-a-tape, clipboard and pencil require that the accident scene not be disturbed for an extended period of time prior to clearing. During this laborious investigation process, other vehicular traffic is either slowed or totally obstructed which can itself lead to secondary incidents or accidents involving other vehicles or individuals assisting at the scene. Over and above the increased danger to the investigating officer and other motorists, the economic impact of the closure of a single lane of traffic on a three-lane roadway is estimated to be on the order of $5000 for each twenty (20) minutes the lane remains closed.

As a result of the aforementioned dangers and concomitant economic factors, it is vitally important that the investigating officer record and then clear an accident scene as rapidly as possible. Nevertheless, the data recorded must be accurate and verifiable for later use in reconstructing the incident and formal procedures must be followed such that the integrity of the data gathered might be ensured. Heretofore, two methods of determining distances regarding an accident scene have been generally employed utilizing a mechanical distance measuring device like a roll-a-tape combined with the manual recordation of the distances on a clipboard.

The "baseline" (or "baseline/offset") method is one recordation technique in which an imaginary grid or coordinate system is established overlying the accident scene with a first axis fixed between two permanent objects or positions adjacent the site (such as traffic signs, utility poles and the like) which are utilized as control points. The investigating officer must then manually measure a series of distances along the first axis to establish various positions (e.g. the abscissa), at which positions he must then additionally walk off and make a like series of right angle measurements to vehicle tires, skid marks and the like to establish the coordinate along the second axis (e.g. the ordinate). The resulting "x,y" values can then be utilized to reconstruct the accident scene on a grid for subsequent investigation.

An alternative technique is the "triangulation" (or "range/triangulation") method. In practice, this technique requires that a pair of fixed object or position control points also be selected and the distance between them established by manual measurement. The officer then positions himself adjacent the various points of interest (such as the first vehicle's left front tire, the second vehicle's right front tire and the like) and then walks off and measures the distance to both of the control points for each point of interest. The resultant data can then be utilized to calculate the x,y position of the various points with respect to the control points by knowledge of the lengths of the three sides of the triangle formed. However, due to the relative difficulty most officers have in computing the coordinates, this final step is seldom undertaken.

In practice, the baseline technique is the most time consuming to implement in the field but the most expeditious to reconstruct back at the police station. The converse is true of the triangulation method. However, regardless of the technique employed, current roll-a-tape, clipboard and pencil techniques are time consuming as well as subject to measurement errors when obstructions are in the path of the measurement to be made and recordation errors which might not be detected until after the accident has been cleared. Moreover, during the entire process, the normal traffic flow at the scene is disrupted and the investigating officer is exposed to the attendant dangers of making the measurements for an extended period of time.

Although requiring a high degree of training and experience not generally known to the attending officer, conventional surveying techniques might also be utilized to record the features of an accident scene. In this regard, a survey specialist and accompanying rodman must be brought to the scene with their equipment to then establish survey measurements at the site. This technique further slows the recordation of the accident features prior to clearing of the scene and is more time consuming and labor intensive in its implementation.

SUMMARY OF THE INVENTION

Disclosed herein is a system and method for data entry and retroactive reconstruction of scenes, especially transitory occurrences such as vehicle accidents, utilizing a laser-based speed and distance determining device. In a particular embodiment, the system and method herein disclosed may be advantageously implemented utilizing a commercially available laser based speed and ranging instrument such as the LTI 20/20 Marksman™ device designed and manufactured by Laser Technology, Inc. 7070 S. Tucson Way, Englewood, Colo. 80112, assignee of the present invention. Certain aspects of the Marksman device are disclosed in U.S. Pat. No. 5,359,404 for "Laser-Based Speed Measuring Device" issued to Laser Technology, Inc., the disclosure of which is herein specifically incorporated by this reference.

The Marksman device is one already in extensive use by law enforcement agencies world-wide for speed limit enforcement due to its ease of use, portability and extremely accurate and rapid measurement of vehicle speed by determining the time of flight of a series of laser pulses transmitted to a target and reflected back from the target to the instrument. Incorporating a serial output port in addition to an in-sight, head-up display of target speed and/or range, data determined as to a feature's or object's distance can be directly transferred via the port to a field data collector/recorder such as the Hewlett-Packard model HP48GX. This data recorder computational capability may be specifically programmed to facilitate implementation of the system and method of the present invention by means of a flash programmable read-only memory ("PROM") card and the data recorder itself may be physically and removably attached to the exterior of the Marksman device in addition to its electrical coupling for data entry and collection.

Specifically disclosed is a range/triangulation method for determining the first and second coordinates of at least one of a plurality of positions of various features or objects with respect to first and second control points established adjacent thereto. The method comprises the steps of initially determining a first distance between the first and second control points (which may be accomplished utilizing a signal transmitting and receiving distance measuring device to produce and receive a first transmitted and first received signal respectively between the control points and measuring the time of flight therebetween) and then positioning the distance measuring device at one of the plurality of positions. A second transmitted signal is then directed toward the first control point, producing a second reflected signal which is received from the first control point back at the distance measuring device. The second distance between that one of the plurality of positions and the first control point is based on a time of flight of the second transmitted and second reflected signals. A third transmitted signal is then directed toward the second control point to produce a third reflected signal from the second control point at the distance measuring device. A third distance between that same one of the plurality of positions and the second control point is then determined based on a time of flight of the third transmitted and third reflected signals. Alternatively, the second and third distances may be determined by positioning the distance measuring device at the first and second control points and then directing the transmitted signals towards a feature or object occupying the same one of the plurality of positions to be determined.

Alternatively a baseline position method is disclosed for determining the first and second coordinates of a feature or object occupying one of a plurality of positions with respect to a baseline extending between first and second control points fixed adjacent the feature or object. The method comprises the steps of positioning a signal transmitting and receiving distance measuring device at one of a plurality of points along the baseline perpendicular to that specific one of the plurality of positions. A first transmitted signal is directed toward the first control point producing a first reflected signal from the first control point which is received at the distance measuring device. A first distance between that point on the baseline and the first control point is then determined based on a time of flight of the first transmitted and first reflected signals. A second transmitted signal is then also directed toward the object at that specific one of the plurality of positions and a second reflected signal is received from the object back at the distance measuring device. A second distance between the object and that position on the baseline is determined based on a time of flight of the second transmitted and second reflected signals thereby establishing the coordinates of the feature.

Further disclosed is a system for recording relative positional data points of a scene comprising a signal transmitting and receiving distance measuring device having a user aiming sight for directing a transmitted signal toward each in a series of selected objects or features and receiving a reflected signal therefrom. The distance measuring device is capable of determining a distance to each of the series of selected objects or features based upon a time of flight of the transmitted signals directed to each one of the series of selected objects or features and reflected signals received from each one of the series of selected objects or features. A data recorder is associated with the distance measuring device and has a data input section for manual actuation by the user and incorporates a display viewable by the user. The data recorder, which may be directly coupled to the distance measuring device to receive the distance information, stores data indicative of a plurality of the distances to each of the selected objects or features and displays selected ones of the distances on the display. Each of the distances stored may be associated with a user selected distance identifier input to the data input section and the x,y coordinates of the features may be automatically calculated by the data recorder based upon the distances measured and stored.

BRIEF DESCRIPTION OF THE DRAWINGS

The aforementioned and other features and objects of the present invention and the manner of attaining them will become more apparent and the invention itself will be best understood by reference to the following description of a preferred embodiment, taken in conjunction with the accompanying drawings, wherein.

DESCRIPTION OF A PREFERRED EMBODIMENT

Figure 1:
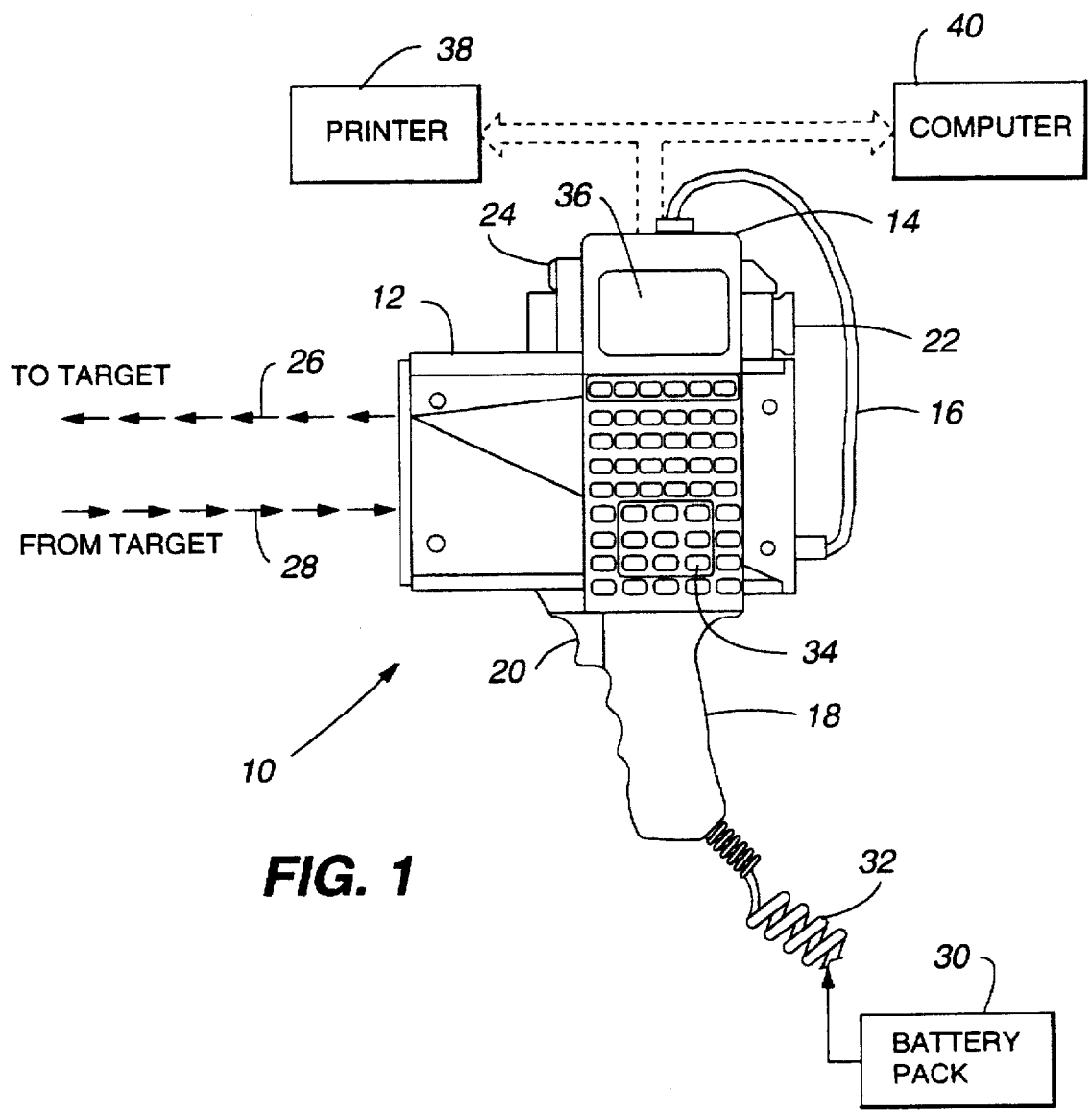
FIG. 1 is a side elevational view of a particular embodiment of a system in accordance with the present invention comprising a hand-held laser speed and ranging instrument incorporating a head-up display aiming sight (or other sighting device) physically and electrically coupled to a field data collection device and further illustrating the capability of downloading information gathered by the laser speed and ranging instrument and stored in the data collection device to an associated printer or computer.

With reference now to FIG. 1, a system 10 for data entry and retroactive reconstruction of the relative position of features and object utilizing a signal transmitting and receiving distance determining device is shown. The system comprises, in pertinent part, a distance determining device 12 electrically and physically coupled to a data recorder 14. In the particular embodiment illustrated, the distance measuring device 12 comprises an LTI 20/20 Marksman™ laser based speed and ranging instrument designed and manufactured by Laser Technology, Inc., 7070 South Tucson Way, Englewood, Colo., assignee of the present invention. The Marksman device is in wide use with law enforcement agencies throughout the world for measurement of vehicle speed and is, therefore, potentially readily available to facilitate implementation of the system and method herein disclosed without the need to provide an additional distance measuring device, which is an alternative function of the Marksman instrument. The data recorder 14 as illustrated may comprise a Hewlett Packard Model HP48GX field data collector. The Marksman distance measuring device 12 incorporates a serial port which may be utilized to directly couple the distance measuring device 12 to the data recorder 14 by means of a data cable 16. In this manner, distance measurements made utilizing the distance measuring device 12 may be input directly to the data recorder 14 without manual entry.

As shown, the distance measuring device 12 incorporates a pistol grip 18 for manual retention by a user and to enable aiming of the distance measuring device 12 toward a number of features and objects, for example, at an accident scene. A trigger 20 is squeezed by the user in order to initiate the distance measurement functionality of the distance measurement device 12. In other implementations of the system 10, an activation device or switch other than the trigger 20 may be employed.

An aiming scope 22 incorporating an insight head-up display 24 allows a user to place a reticle on a feature or object, the distance of which is to be determined, and view the distance measurement within the head-up display 24 simultaneously with the inputting of digital data representative of that distance via the data cable 16 directly to the data recorder 14. Alternatively, a simple sighting device for visually acquiring a desired feature may be employed instead of the head-up display 24. Upon squeezing the trigger 20, a transmitted signal 26 comprising a series of laser pulses is directed toward the feature or object upon which the reticle has been visually placed by the user. The transmitted signal 26 is then reflected back from the feature or object comprising the target, producing a reflected signal 28 which is received by the distance measuring device 12. The distance to the target is calculated based upon the time of flight of the laser pulses of the transmitted and reflected signals 26, 28.

The distance measuring device 12 receives power from a portable battery pack 30 via a power cord 32. The data recorder 14 also includes a manually actuatable keypad 34 for inputting data to the data recorder 14 in addition to that which is input thereto directly from the distance measuring device 12 via the data cable 16. The data recorder 14 includes a visual display 36 indicative of various range and other alpha-numeric information pre-programmed therein, or directly or manually input to the data recorder 14 through use at a given site.

The system 10 may also be directly coupled to a printer 38 for printout of information input to, and collected by, the data recorder 14 when in operation. In a particular application, the printer 38 may comprise a small portable infrared printer to allow a user of the system 10 to print out a "hard copy" of the information gathered directly at the scene of the features and objects being recorded. Additionally, the data retained within the data recorder 14 collected at a scene may be downloaded to a computer 40 as an ASCII text file for database storage or word processing use or may be converted to drawing exchange format ("DXF") or similar format for use in conjunction with computer aided design ("CAD") or geographical information system ("GIS") packages. In conjunction with the latter software, the information may be directly utilized to produce computer generated maps of the scene indicative of the relative position of the features and objects recorded in operation of the system 10.

Figure 2:
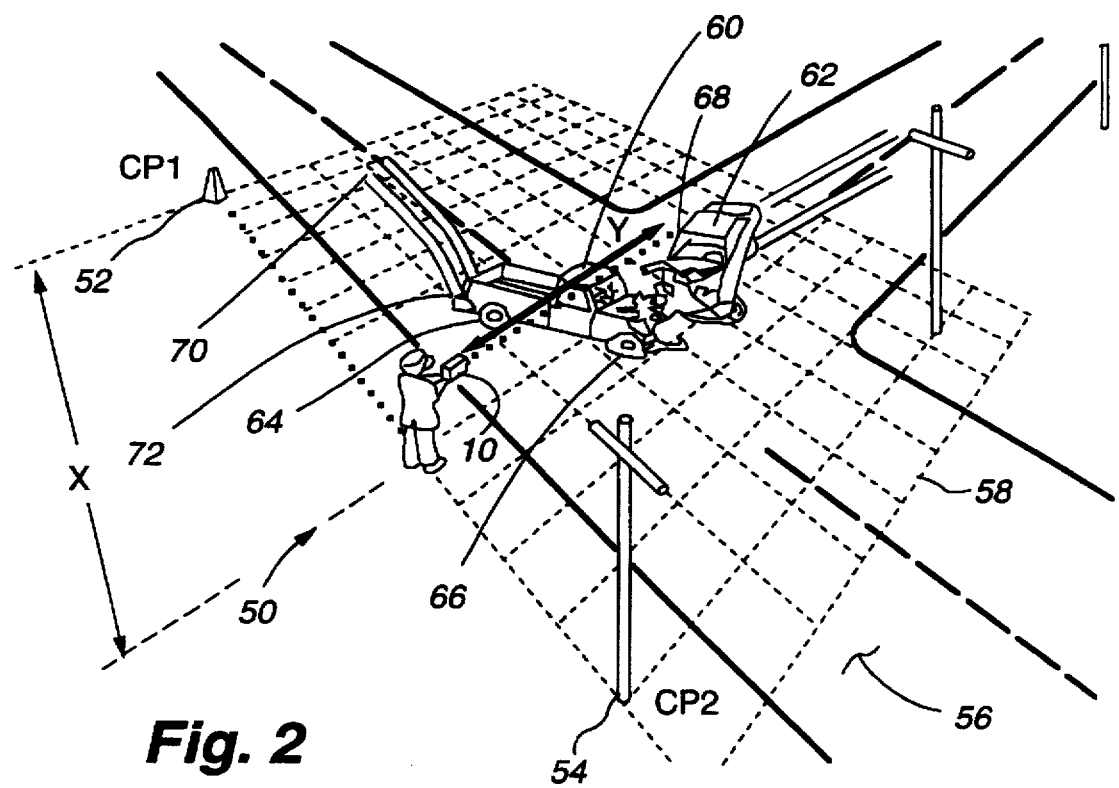
FIG. 2 is a perspective view illustrative of the possible use of the system of FIG. 1 at the scene of a vehicle accident to make baseline determinations of the position of various portions of the vehicles involved and other features with respect to distances measured at right angles to a baseline position established between two fixed control points ("CP1", "CP2") at a distance ("$d_z$") to determine the x,y coordinates of various features in accordance with one method of the present invention.

With reference additionally now to FIG. 2, a baseline/offset position method 50 for determining the relative position of features and objects at a scene is shown utilizing the system 10 of FIG. 1. The baseline position method 50 comprises the steps of initially determining a pair of control points such as control point 52 ("CP1") and control point 54 ("CP2"). In the exemplary illustration depicted, control point 52 may comprise a fixed object or added feature (such as a traffic cone placed at a known position to reflect the incident laser beam) in conjunction with a control point 54 comprising a fixed scene feature such as a utility pole. An imaginary line extending between control point 52 to control point 54 then comprises a baseline as a reference for determining the coordinates of various features and objects at the scene.

In the representative illustration shown, the scene comprises a vehicular accident which has occurred on a roadway 56. Prior to clearing the accident scene, the relative position of various features and objects representative of the vehicle positions, the initiation of skids and various objects which may have been ejected from the vehicles are accurately determined for later law enforcement and liability determination purposes. Utilizing the baseline position method 50 shown, an imaginary grid 58 is overlain upon the accident scene and the x,y coordinate positions of the various features and objects determined within the grid 58. In this exemplary illustration, the scene includes an accident between a first vehicle 60 and a second vehicle 62. To accurately reconstruct the scene after the accident has been cleared, the relative position of various features and objects of the accident scene are accurately determined such as the position of the right rear tire 64 and right front tire 66 of the first vehicle 60 as well as the right rear tire 68 of the second vehicle 62. Other information relative to the accident scene may include the skid mark inception point 70 and skid mark end point 72 of the first vehicle 60.

In order to determine the coordinates of, for example, the right rear tire 68 of the second vehicle 62, the user of the system 10 would first position himself along the baseline extending between the control points 52, 54 to a position perpendicular to that of the right rear tire 68. The user would then aim the system 10 toward the control point 52 to determine the distance therefrom and the system 10 will automatically enter that distance as the value of the x coordinate of the object being sighted if the control point 52 is initially determined to have x,y coordinates of "0,0". Alternatively, the user may manually enter the distance displayed in the head-up display 24 of the aiming scope 22 by means of the keypad 34 (FIG. 1).

The user then would aim the system 10 90° toward the right rear tire 68 to determine the distance to the feature or object from the baseline extending between the control points 52, 54, entering that distance as the y coordinate. Whether the feature is to the left or right of the baseline is also entered by the user in response to a prompt on the visual display 36 and that information is utilized to automatically compute a corresponding "+" or "−" value. By repeating this procedure as will be more fully described hereinafter in conjunction with the manual input of feature descriptors to the keypad 34 (FIG. 1) of the system 10, data is then entered into the system 10 and is retained thereby in order to accurately reconstruct the accident scene at a later time.

Figure 3:
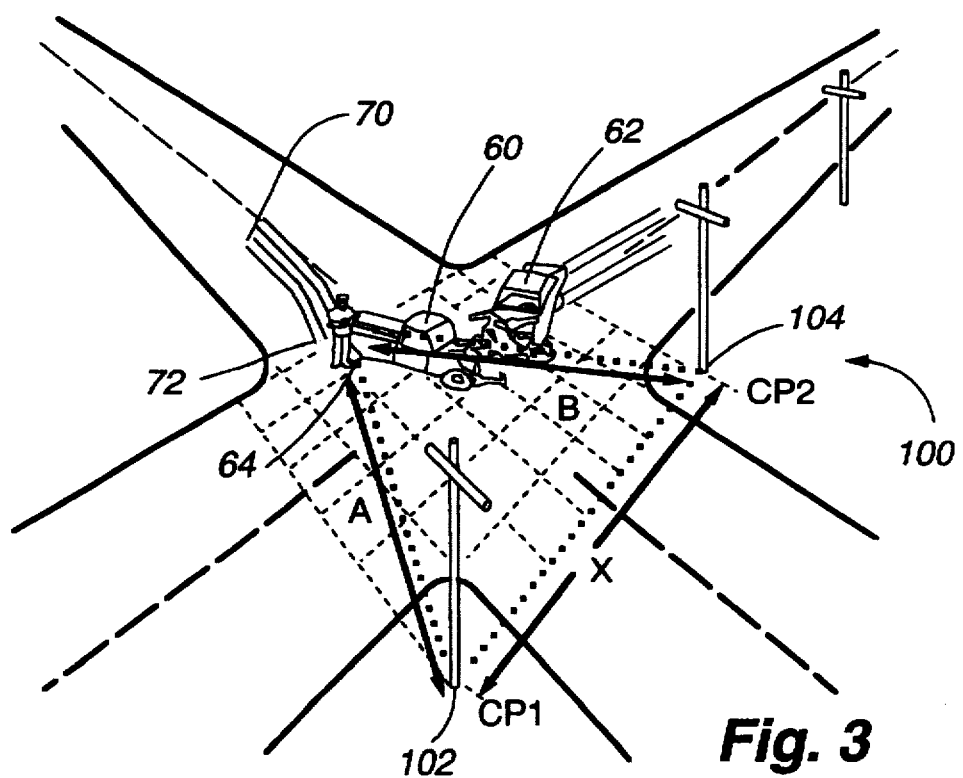
FIG. 3 is a further perspective view illustrative of still another possible use of the system of FIG. 1 at the same accident scene to make triangulation based determinations of the position of various portions of the vehicles involved and other features with respect to distances ("A","B") measured to two fixed control points ("CP1", "CP2") at a known distance apart ("X") in accordance with another method of the present invention which is then used to calculate the x,y coordinates of such features.

With reference additionally now to FIG. 3, a range/triangulation method 100 for utilizing the system 10 is shown which method comprises an alternative technique for recording and facilitating the later reconstruction of information regarding the relative position of various features and objects at a scene. Utilizing prior techniques such as roll-a-tape, clipboard and pencil, the baseline position method 50 is the more difficult method to utilize at an accident scene although results in the easiest computation of the x,y coordinates of various features and objects inasmuch as they are recorded directly. On the other hand, the prior use of the same manual system to effectuate a range/triangulation determination of relative positions of various features and objects has proven to be the simpler technique to use at an accident site yet it requires more intense trigonometric calculation to derive the x,y coordinates of the various features and objects, if the latter step is even undertaken due to its relative difficulty. However, utilizing the range/triangulation method 100 in conjunction with the system 10, the x,y coordinates are directly computed for the user by the system 10 thereby allowing a quicker recordation of distances to various features and objects at a scene without having to manually compute the x,y coordinates from the range measurements taken.

The range/triangulation method 100 illustrated begins by again establishing a pair of control points, in this case control point 102 and control point 104, comprising, for example, two fixed objects adjacent the scene to be recorded such as the pair of utility poles illustrated. The distance between the control points 102, 104 may be directly entered if a known value, or may be determined by standing at, for example, the control point 102 and aiming the system 10 toward the control point 104 to determine the distance therebetween. The distance between the control points 102, 104 then determines, for example, the value of the variable "X". Once the distance between the control points 102, 104 is determined in conjunction with the definition of their respective x,y coordinates, the user of the system 10 may then position himself adjacent a desired feature (such as that of the right rear tire 64 of the first vehicle 60) and take a pair of measurements from that position to the two control points 102, 104 thus determining two distances "A" and "B". Utilizing the values of "A", "B" and "X" (with the initial coordinates of the control points 102, 104) the x,y coordinates of the feature or object such as the right rear tire 64 may be automatically calculated by the data recorder 14. Alternatively, the user of the system 10 may determine the distances "A" and "B" by standing at the control points 102, 104 and determining the distances by aiming the system 10 toward the right rear tire 64. Again, the user is prompted to enter whether the feature is to the left or right of the line extending between the two control points 102, 104 to allow for automatic calculation of a "+" or "−" value.

Figure 4A:
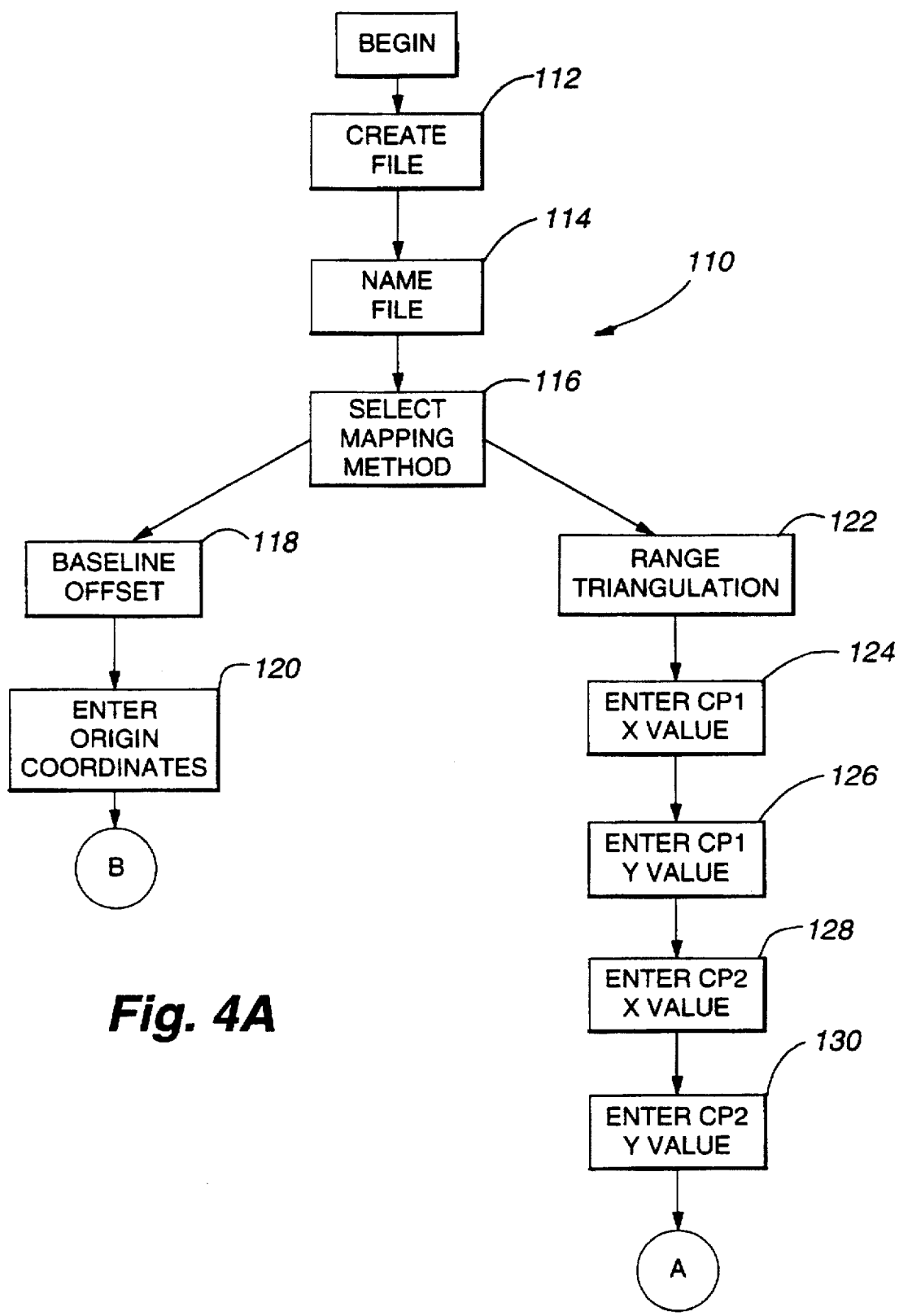
FIGS. 4A–4C are representative flow charts depicting the alternative baseline/offset and range/triangulation processes as illustrated in FIGS. 2 and 3 respectively in accordance with the methods of the present invention utilizing the system shown in FIG. 1.
Figure 4B:
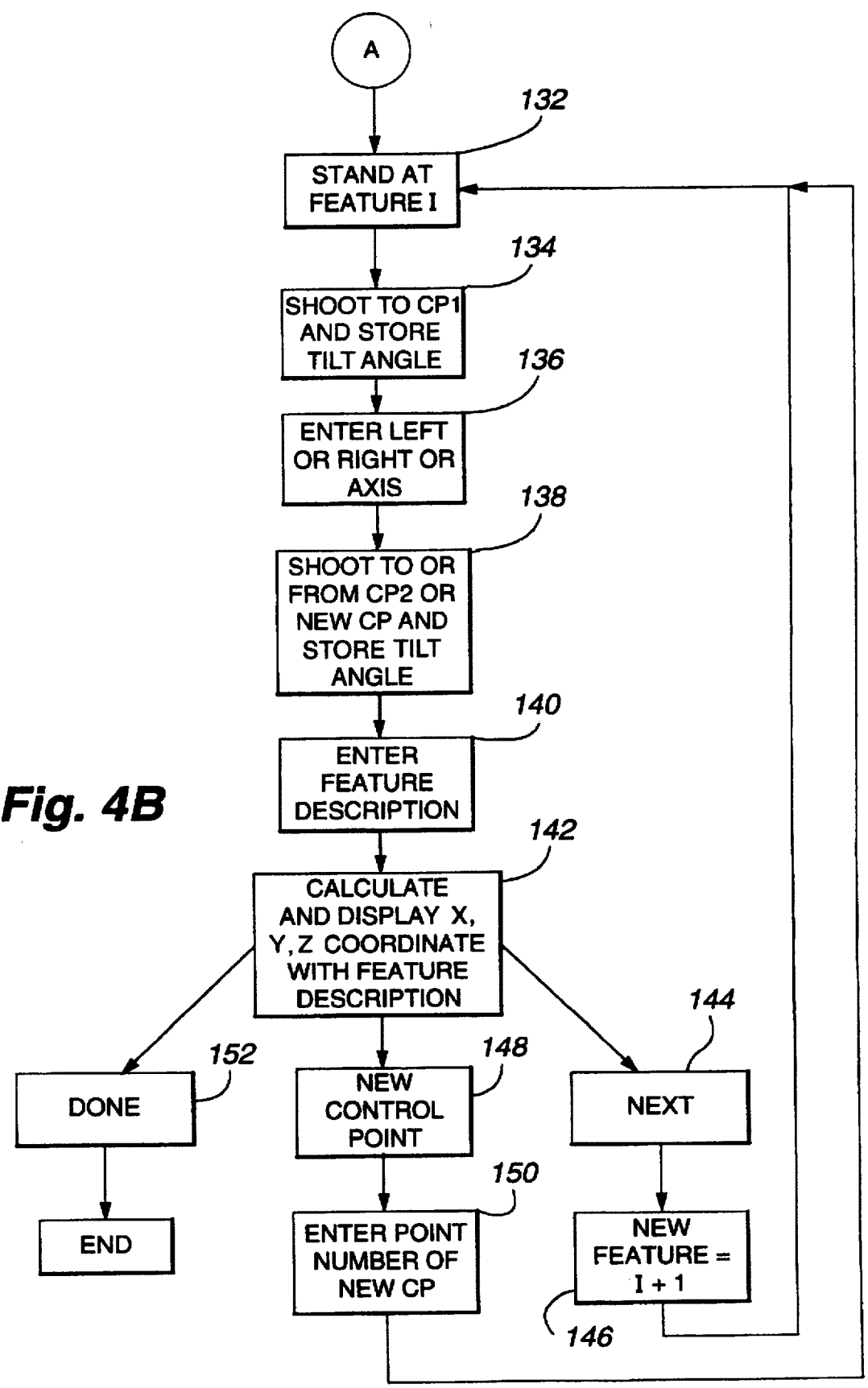
Figure 4C:
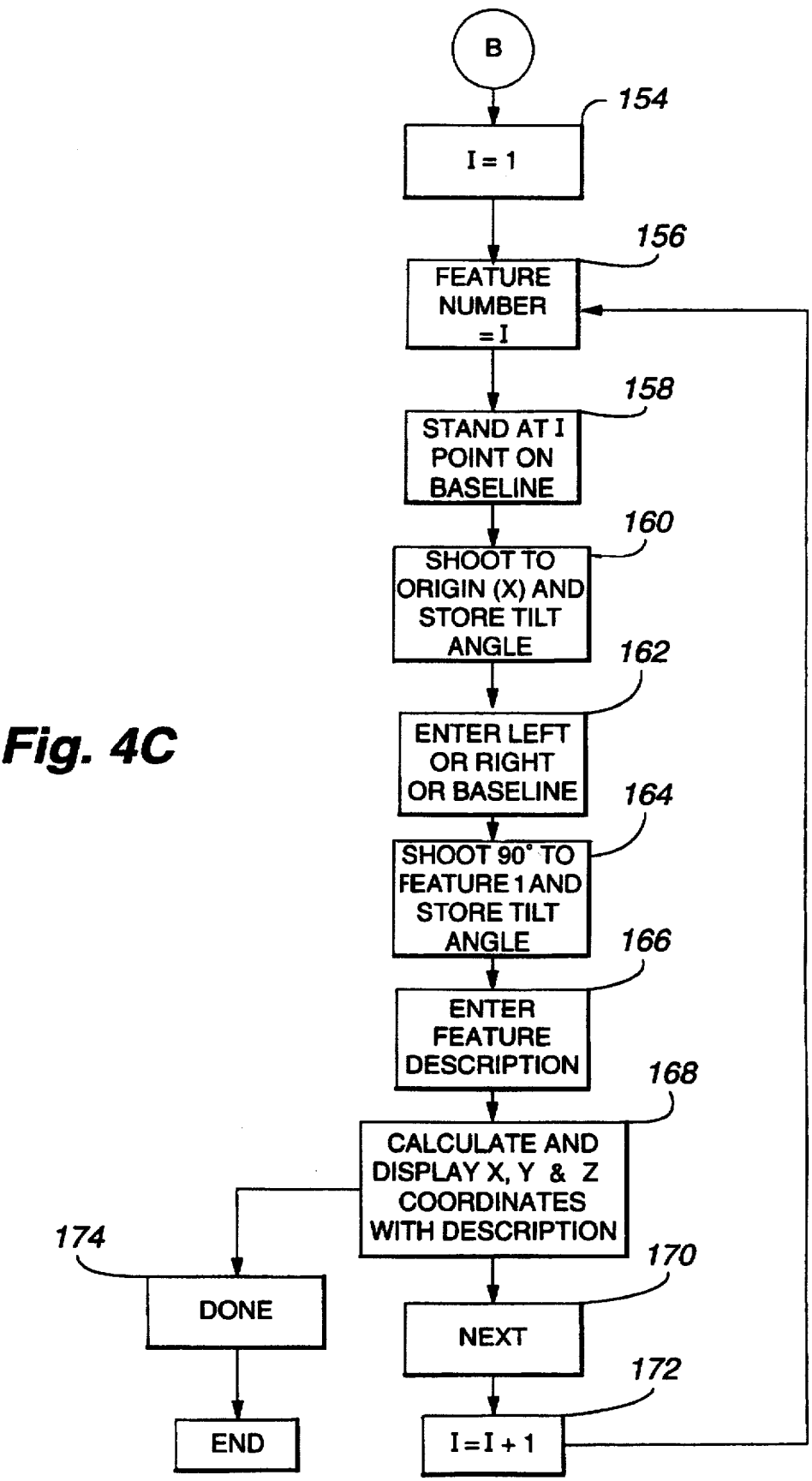

With reference additionally now to FIGS. 4A–4C, a logic flow for effectuating the baseline position method 50 of FIG. 2 and the range/triangulation method 100 of FIG. 3 is shown when utilizing the system 10. The process 110 begins at step 112 where a file associated with the particular scene is created on the data recorder 14. The user of the system 10 is then prompted by the display 36 of the data recorder 14 to enter a name for the file created at step 114 to enable the later retrieval of the file by name. The name for the file is entered via the keypad 34 of the system 10. The display 36 of the data recorder 14 then prompts the user of the system 10 to select the mapping method to be utilized at the scene at step 116. Should the baseline position method 50 be selected, at step 118 the user is then prompted to enter the origin x,y coordinates (generally 0,0) at step 120 to begin the baseline/offset method for determining the relative position of various features and objects.

Alternatively, should the user select the range/triangulation method 100, at step 122 the user is then prompted to enter the value of the x coordinate of the first control point at step 124 and the y value of the first control point at step 126. These may generally be entered as "0,0". The user is then prompted to enter the x value of the second control point at step 128 and the y value of the second control point at step 130. Where "0,0" has been chosen as the coordinates of the first control point, the x coordinate of the second control point will also be "0" and the y coordinate will be the linear distance between the two control points as determined as described herein or otherwise known. This distance may be determined by positioning the system 10 at the first control point and shooting to the second control point.

In the event the range/triangulation method 100 (FIG. 3) has been selected, the process 110 then proceeds to step 132 as shown in FIG. 4B, wherein the user of the system 10 positions himself at the first feature or object of interest at the scene. From this position, the user aims the system 10 toward the first control point at step 134 to determine the distance from the feature to that first control point. The display 36 of the data recorder 14 then prompts the user to enter an indication of whether the feature is to the left or right of the axis determined between the first and second control points at step 136. In order to determine the distance from the particular feature to the second control point, the user at step 138 will aim the system 10 from the feature to the second control point (or from the second control point to the feature) to determine that distance. In the event that more than a single pair of control points has been selected, the same procedure would be followed with respect to the new control points.

After having determined the distances between the desired feature and the first and second control points, the display 36 of the data recorder 14 (FIG. 1) prompts the user of the system 10 at step 140 to enter a feature descriptor representative of the particular feature associated with those distance values. The data recorder 14 may be programmed to facilitate the entry of the feature descriptor by providing a menu of complete or abbreviated feature descriptors which may then be selected by the user of the system 10 as an alternative to manually entering the individual characters comprising the descriptor.

At step 142, the computational capability of the data recorder 14 then calculates the x,y coordinates of the selected feature based upon its distance to the first and second control points, which control points have been previously determined to be a known distance apart and having known coordinate positions. These x,y coordinates are then displayed on the display 36 of the data recorder 14 in conjunction with the feature descriptor selected or entered by the user of the system 10. Since it is often necessary that the relative position of a number of features and objects at a scene be determined, the process 110 then proceeds to step 144 to allow entry of the distances to the pair of control points of another feature at the scene. In this regard, at step 146, the next feature is numbered by incrementing the preceding feature "T" with 1 to return to step 132 to again repeat steps 134-142 with respect to the next feature.

As previously described, in the event an additional control point is required to adequately determine the relative position of the various features and objects at a scene, at step 148 a new control point is selected and the point number of the new control point is determined at step 150 by measuring the distance to the additional control point (which is preferably a previously recorded point) from the first and second control points. In this event, the process 110 then also returns to step 132 to determine the position of various features or objects with respect to the first control point and the third or subsequent control point selected. Once the relative positions of all desired features and objects at the scene have been determined with respect to all selected control points, the process 110 proceeds to step 152 wherein the range/triangulation method has been completed.

With specific reference to FIG. 4C, the portion of the process 110 utilized for implementing the baseline position method 50 (FIG. 2) of the present invention is shown. This process begins by setting a variable "T" equal to 1 indicative of the first feature as to which the x,y coordinates are to be determined. At step 156, the feature number is set to the current value of the variable "T". Thereafter at step 158, the user of the system 10 positions himself at a point along the baseline established between the first and second control points directly perpendicular to the feature "T". The user then aims the system 10 at the origin or first control point at step 160 to determine the value "x" for the x,y coordinates of the feature "T". The display 36 of the data recorder 14 then prompts the user to enter an indication of whether the feature "T" is to the left or right of the baseline determined between the first and second control points at step 162.

The user of the system 10 then aims it toward the feature "T" at 90° to the baseline extending between the first and second control points to determine the distance to the feature "T" from the baseline at step 164. This distance then gives the value of the "y" portion of the x,y coordinates directly if the coordinates of the first control point has been defined as "0,0". Display 36 of the data recorder 14 then allows the user to enter or select a feature descriptor for the feature "T" in the manner previously described at step 166.

The data recorder 14 then displays the x,y coordinates derived from the distances measured and displays the same along with the selected or input feature descriptor at step 168. The same process is followed with respect to subsequent features or objects at step 170 and the value of the variable "T" is incremented by 1 prior to the process returning to step 156. Once all features and objects at the scene have been recorded as to their relative position to the baseline between the first and second control points, the process is completed at step 174.

With reference now to table 1, a representative point list is shown which may be generated and displayed on the display 36 of the data recorder 14 or downloaded in an ASCII, DXF or other format to a computer 40 (FIG. 1) for subsequent storage and/or manipulation. As previously described, either the baseline position method 50 illustrated in FIG. 2 or the range/triangulation method 100 illustrated in FIG. 3 as described in more detail in FIGS. 4A-4C may be utilized to generate the point list of table 1.

TABLE 1

POINT LIST

| Number | x | y | NOte |
|---|---|---|---|
| 1 | 0.00 | 0.00 | CP1 |
| 2 | 107.00 | 0.00 | CP2 |
| 3 | 53.50 | −51.12 | DFTIRE |
| 4 | 39.67 | −50.22 | DRTIRE |
| 5 | 39.67 | −50.22 | PRTIRE |
| 6 | 39.56 | −56.53 | DFVH2E |
| 7 | 40.49 | −67.83 | DRVH2 |
| 8 | 45.37 | −68.31 | PRVH2 |
| 9 | 46.73 | −88.41 | SKVH2 START |
| 10 | 11.44 | −43.52 | SKVD1 START |
| 11 | 10.06 | −54.07 | CURB ST. |
| 12 | 24.52 | −54.76 | CURB LN. |
| 13 | 35.55 | −62.61 | CURB LN. |
| 14 | 38.64 | −75.71 | CURB END |
| 15 | 66.96 | −71.56 | STOP SIGN |

In addition to the point list shown, the system 10 can further provide a direct, scaled print-out (or scale plot) of the points and their relative positions. In this manner, a pictorial representation of the accident scene features may be quickly made by manually adding pictures of the surrounding features, vehicles and the like at the points indicated in the scale plot. Alternatively, and in conjunction with a computer graphics package, the scene may be illustrated entirely by computer in conjunction with the scale plot and the accompanying feature descriptors.

While there have been described above, the principles of the present invention in conjunction with specific apparatus, it is to be clearly understood that the foregoing description is made only by way of example and not as a limitation to the scope of the invention. For example, although illustrated and described with respect to a laser based range finding instrument, any signal transmitting and receiving device useful for measuring distance may be utilized in conjunction with a data recorder in which distance information is entered directly from the ranging instrument or manually by the operator.

What is claimed is:

1. A method for determining first and second coordinates of a selected feature occupying at least one of a plurality of positions of a scene with respect to first and second control points fixed adjacent said scene, said method comprising the steps of:

initially determining a first distance between said first and second control points;

positioning a signal transmitting and receiving distance measuring device adjacent said selected feature at said at least one of said plurality of positions;

directing a first transmitted signal toward said first control point;

receiving a first reflected signal from said first control point at said distance measuring device;

secondly determining a second distance between said at least one of said plurality of positions and said first control point based on a time of flight of said first transmitted and first reflected signals;

also directing a second transmitted signal toward said second control point;

also receiving a second reflected signal from said second control point at said distance measuring device;

thirdly determining a third distance between said at least one of said plurality of positions and said second control point based on a time of flight of said second transmitted and second reflected signals; and storing said first, second and third distances for subsequent calculation of said first and second coordinates.

2. The method of claim 1 wherein said step of initially determining is carried out by the steps of:

additionally positioning said signal transmitting and receiving distance measuring device adjacent said first control point;

additionally directing a third transmitted signal toward said second control point;

additionally receiving a third reflected signal from said second control point at said distance measuring device; and additionally determining said first distance between said first and second control points based on a time of flight of said third transmitted and third reflected signals.

3. The method of claim 1 further comprising the step of:

computing an abscissa and ordinate of said feature with respect to a line through said first and second control points based upon said second and third distances.

4. The method of claim 1 wherein said steps of directing, receiving, also directing and also receiving are carried out by means of a laser based ranging instrument.

5. The method of claim 4 wherein said steps of secondly and thirdly determining are carried out by means of a programmable field data collector.

6. The method of claim 5 wherein said first, second and third distances are electronically input to said field data collector by said laser based ranging instrument.

7. The method of claim 5 further comprising the step of:

manually entering a verbal descriptor associated with said selected feature to said field data collector.

8. The method of claim 1 wherein said steps of positioning, directing and also directing are prompted by a display associated with said signal transmitting and receiving distance measuring device.

9. The method of claim 8 wherein said first and second coordinates are automatically computed based upon said first, second and third distances and displayed on said display.

10. A method for determining first and second coordinates of a selected feature occupying at least one of a plurality of positions of a scene with respect to first and second control points fixed adjacent said scene, said method comprising the steps of:

initially determining a first distance between said first and second control points;

positioning a signal transmitting and receiving distance measuring device adjacent said first control point;

directing a first transmitted signal toward said selected feature at said at least one of said plurality of positions;

receiving a first reflected signal from said at least one of said plurality of positions at said distance measuring device;

secondly determining a second distance between said first control point and said at least one of said plurality of positions based on a time of flight of said first transmitted and first reflected signals;

repositioning said distance measuring device adjacent said second control point;

also directing a second transmitted signal toward said at least one of said plurality of positions;

also receiving a second reflected signal from said at least one of said plurality of positions at said distance measuring device;

thirdly determining a third distance between said second control point and said at least one of said plurality of positions based on a time of flight of said second transmitted and second reflected signals; and storing said first, second and third distances for subsequent calculation of said first and second coordinates.

11. The method of claim 10 wherein said step of initially determining is carried out by the steps of:

additionally positioning said signal transmitting and receiving distance measuring device adjacent said first control point;

additionally directing a third transmitted signal toward said second control point;

additionally receiving a third reflected signal from said second control point at said distance measuring device; and additionally determining said first distance between said first and second control points based on a time of flight of said third transmitted and third reflected signals.

12. The method of claim 10 further comprising the step of:

computing an abscissa and ordinate of said feature with respect to a line through said first and second control points based upon said second and third distances.

13. The method of claim 10 wherein said steps of directing, receiving, also directing and also receiving are carried out by means of a laser based ranging instrument.

14. The method of claim 13 wherein said steps of secondly and thirdly determining are carried out by means of a programmable field data collector.

15. The method of claim 14 wherein said first, second and third distances are electronically input to said field data collector by said laser based ranging instrument.

16. The method of claim 14 further comprising the step of:

manually entering a verbal descriptor associated with said selected feature to said field data collector.

17. The method of claim 10 wherein said steps of positioning, directing and also directing are prompted by a display associated with said signal transmitting and receiving distance measuring device.

18. The method of claim 17 wherein said first and second coordinates are automatically computed based upon said first, second and third distances and displayed on said display.

19. A method for determining first and second coordinates of a feature occupying at least one of a plurality of positions of a scene with respect to a baseline extending between first and second control points fixed adjacent said scene, said method comprising the steps of:

positioning a signal transmitting and receiving distance measuring device at said least one of a plurality of points along said baseline perpendicular to a specific one of said plurality of positions;

directing a first transmitted signal toward said first control point;

receiving a first reflected signal from said first control point at said distance measuring device;

determining a first distance between said at least one of said plurality of points along said baseline and said first control point based on a time of flight of said first transmitted and first reflected signals;

also directing a second transmitted signal toward said specific one of said plurality of positions;

also receiving a second reflected signal from said specific one of said plurality of positions at said distance measuring device;

also determining a second distance between said at least one of said plurality of points and said specific one of said plurality of positions based on a time of flight of said second transmitted and second reflected signals; and storing said first and second distances for subsequent calculation of said first and second coordinates.

20. The method of claim 19 wherein said steps of directing, receiving, also directing and also receiving are carried out by means of a laser based ranging instrument.

21. The method of claim 20 wherein said steps of determining and also determining are carried out by means of a programmable field data collector.

22. The method of claim 21 wherein said first and second distances are electronically input to said field data collector by said laser based ranging instrument.

23. The method of claim 21 further comprising the step of:

manually entering a verbal descriptor associated with said selected feature to said field data collector.

24. The method of claim 19 wherein said steps of positioning, directing and also directing are prompted by a display associated with said signal transmitting and receiving distance measuring device.

25. The method of claim 24 wherein said first and second coordinates are automatically computed based upon said first and second distances and displayed on said display.

26. A system for recording relative positional data points of a scene comprising:

a signal transmitting and receiving distance measuring device having a user aiming sight for directing a transmitted signal toward each in a series of selected objects at said scene and receiving a reflected signal therefrom, said distance measuring device being capable of determining an object distance to each of said series of selected objects based upon a time of flight of said transmitted signals directed to each one of said series of selected objects and reflected signals received from said each one of said series of selected objects; and a data recorder associated with said distance measuring device having a data input section for manual actuation by said user and a display viewable by said user, said data recorder being coupled to said distance measuring device to store data indicative of a plurality of said object distances to each of said selected objects from said distance measuring device, said data recorder displaying selected ones of said distances on said display and associating each of said object distances with a user selected distance identifier input to said data input section and calculating positional coordinates of at least one of said selected objects.

27. The system of claim 26 wherein said data recorder is programmable to determine an abscissa and ordinate of each of said series of selected objects based upon said object distances.

28. The system of claim 27 wherein said abscissa and ordinate are calculated relative to distances of each of said series of selected objects to first and second control points.

29. The system of claim 28 wherein coordinates of said first and second control points have been entered by said user on said data input section of said data recorder.

30. The system of claim 26 wherein said distance measuring device is electronically coupled to said data recorder by a data bus.

31. The system of claim 30 wherein said data indicative of said plurality of said object distances is input to said data recorder over said data bus.

32. The system of claim 26 wherein said data indicative of said plurality of said object distances is input to said data recorder through said data input section.

33. A system for recording relative positional data points of a scene comprising:

a signal transmitting and receiving distance measuring device having a user aiming sight for directing a transmitted signal toward each in a series of selected objects at said scene and receiving a reflected signal therefrom, said distance measuring device being capable of determining an object distance to each of said series of selected objects based upon a time of flight of said transmitted signals directed to each one of said series of selected objects and reflected signals received from said each one of said series of selected objects; and a data recorder associated with said distance measuring device having a data input section for manual actuation by said user and a display viewable by said user, said data recorder being coupled to said distance measuring device to store data indicative of a plurality of said object distances to each of said selected objects from said distance measuring device, said data recorder displaying selected ones of said distances on said display and associating each of said object distances with a user selected distance identifier input to said data input section wherein said data recorder is programmable to determine an abscissa and ordinate of each of said series of selected objects based upon said object distances and wherein said abscissa and ordinate are determined relative to a position on a baseline between first and second control points defining said abscissa and a corresponding perpendicular distance to each of said series of selected objects defining said ordinate.

34. The system of claim 33 wherein coordinates of said first control point have been entered by said user on said data input section of said data recorder.

35. A system for recording relative positional data points of a scene comprising:

a signal transmitting and receiving distance measuring device having a user aiming sight for directing a transmitted signal toward each in a series of selected objects at said scene and receiving a reflected signal therefrom, said distance measuring device being capable of determining an object distance to each of said series of selected objects based upon a time of flight of said transmitted signals directed to each one of said series of selected objects and reflected signals received from said each one of said series of selected objects; and a data recorder associated with said distance measuring device having a display viewable by said user, said data recorder being coupled to said distance measuring device to store data indicative of a plurality of said object distances to each of said selected objects from said distance measuring device and calculate positional coordinates of at least one of said selected objects.

36. The system according to claim 35 wherein said data recorder calculates and displays coordinates of a plurality of said selected objects from said stored distance data.

37. The system according to claim 36 wherein said recorder further displays a user defined identifier associated with at least one of said objects.

38. The system according to claim 36 wherein said coordinates are rectilinear coordinates.

* * * * *